Sept. 22, 1959

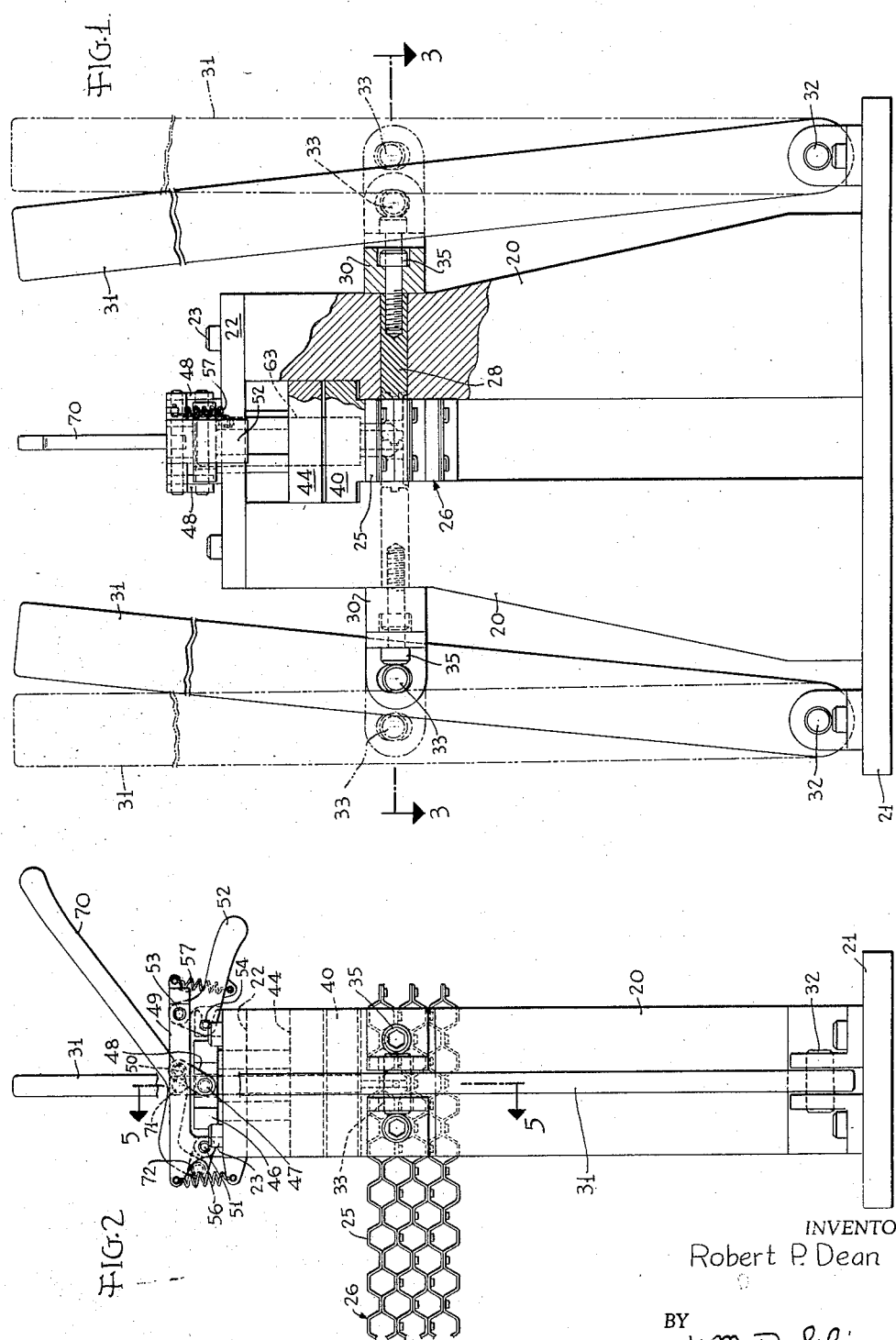

R. P. DEAN 2,905,123

APPARATUS FOR MAKING TAB CONNECTIONS ESPECIALLY
FOR FORMING HONEYCOMB STRUCTURES

Filed July 3, 1957

INVENTOR
Robert P. Dean
BY Wm. R. Glisson
ATTORNEY

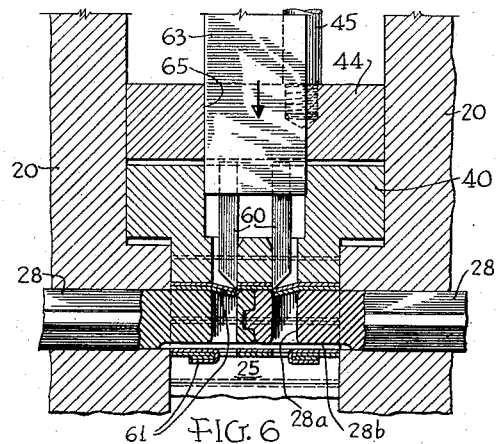
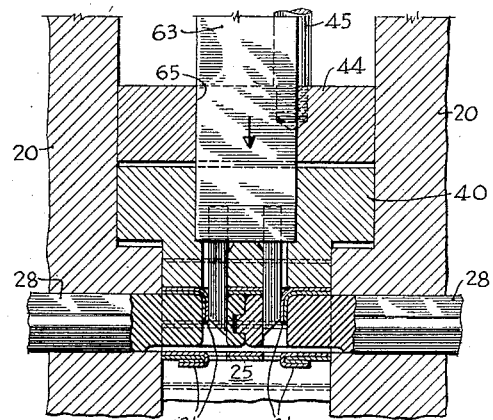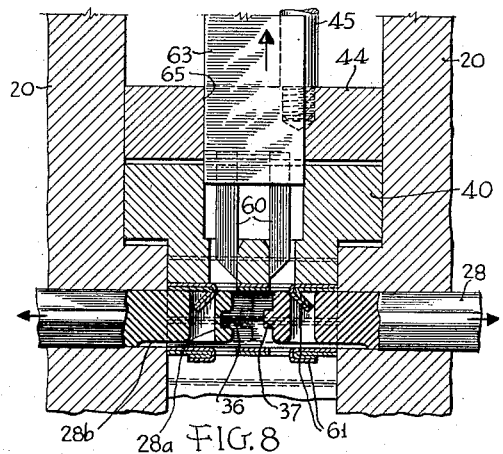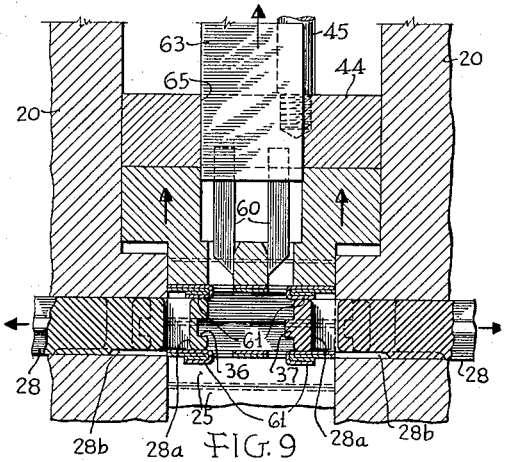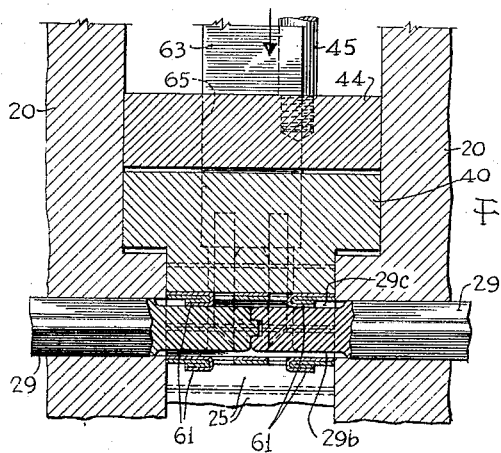

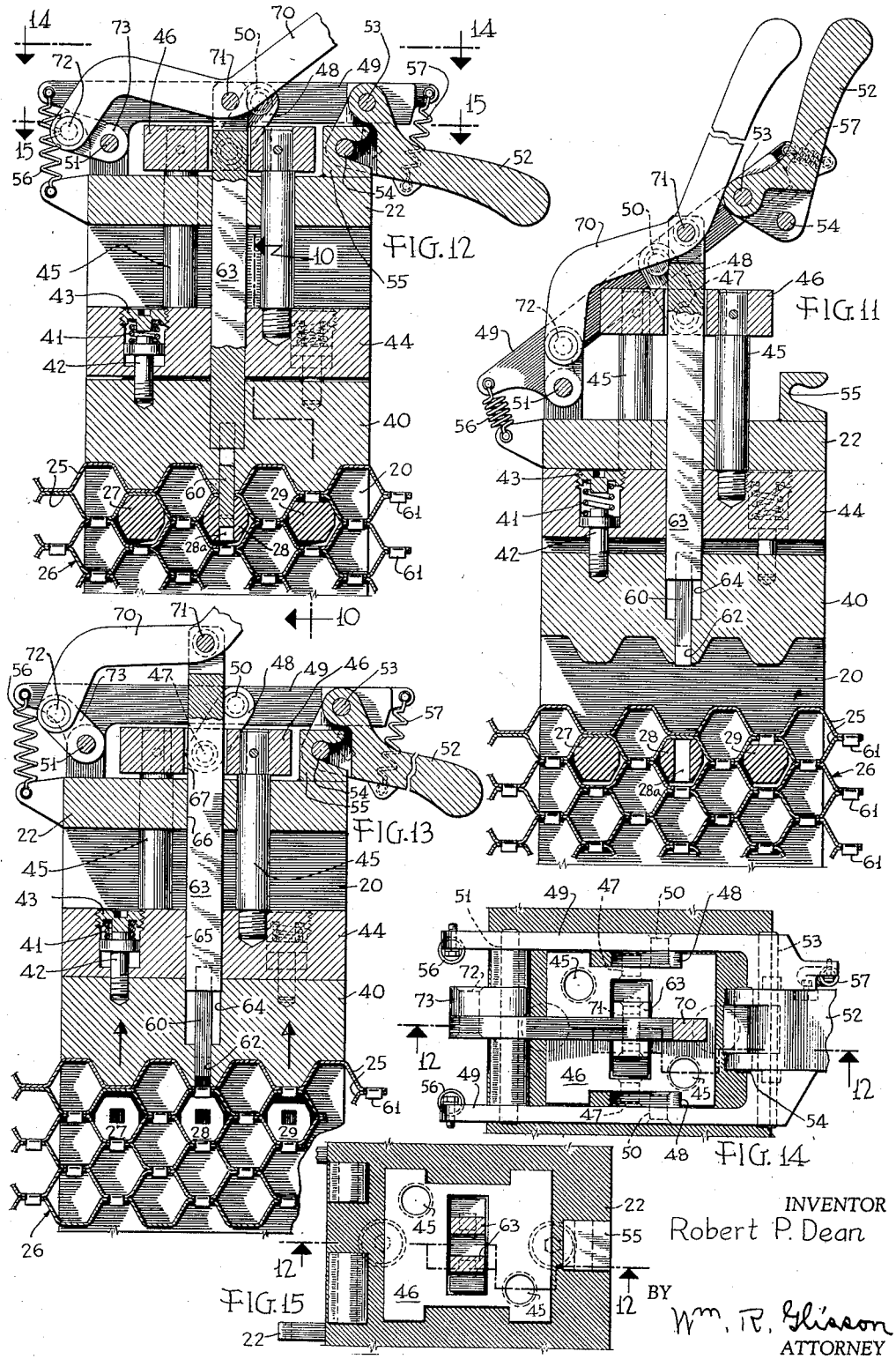

United States Patent Office 2,905,123
Patented Sept. 22, 1959

2,905,123

APPARATUS FOR MAKING TAB CONNECTIONS ESPECIALLY FOR FORMING HONEYCOMB STRUCTURES

Robert P. Dean, Wayne, Pa., assignor to The Budd Company, Philadelphia, Pa., a corporation of Pennsylvania Application July 3, 1957, Serial No. 669,733

13 Claims. (Cl. 113—1)

This invention relates to apparatus for making tab connections, especially for forming honeycomb structures, and has for an object the provision of improvements in this art.

One of the particular objects of the invention is to provide improved apparatus for piercing a sheet to form tabs and clinching the tabs which have been punched out.

Another object is to provide improved tab-forming and clinching apparatus for connecting sheets of material together.

Another object is to provide improved apparatus for securing corrugated sheets together successively to form a honeycomb structure.

The above-mentioned and other objects and various advantages of the invention will be apparent from the following description of an exemplary embodiment, reference being made to the accompanying drawings wherein:

Fig. 1 is an end elevation, partly in section, of a hand-operated machine selected to illustrate the principles of the invention;

Fig. 2 is a front elevation;

Fig. 6 is a vertical section, like Fig. 5 showing the parts at the start of the piercing operation;

Fig. 7 is a section like Fig. 6, showing the parts at the end of the piercing operation;

Fig. 8 is section like Fig. 6, showing the parts at the beginning of the tab clinching operation;

Fig. 9 is a section like Fig. 6, showing the parts at the end of the tab clinching operation;

Fig. 10 is a vertical section taken on the line 10—10 of Figs. 3 and 12;

Fig. 11 is a vertical section taken on the same line as Fig. 12 but showing the parts in open position;

Fig. 12 is a view like Fig. 11 but showing the parts in closed position and a piercing operation completed, the view being taken on the line 12—12 of Figs. 14 and 15;

Fig. 13 is a view like Fig. 12 but showing the parts at the same stage as Fig. 9;

Fig. 14 is a plan view taken on the line 14—14 of Fig. 12; and

Fig. 15 is a horizontal section taken on the line 15—15 of Fig. 12.

Figure 3:
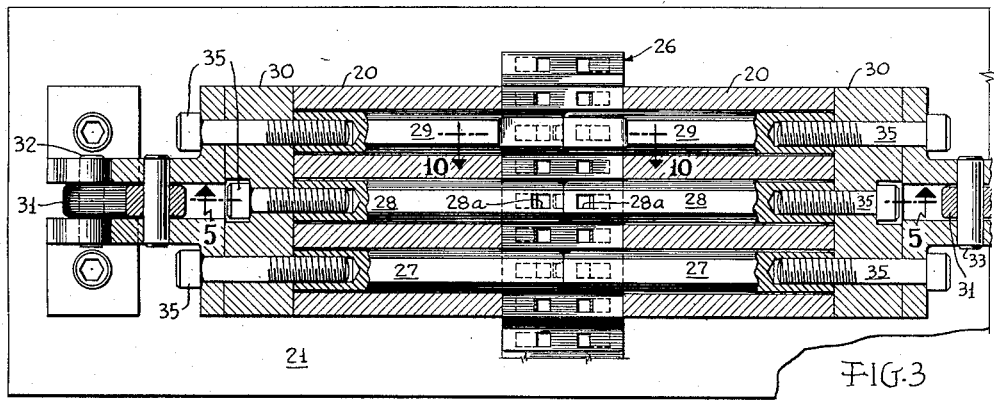
Fig. 3 is an enlarged horizontal section taken on the line 3—3 of Fig. 1.
Figure 4:
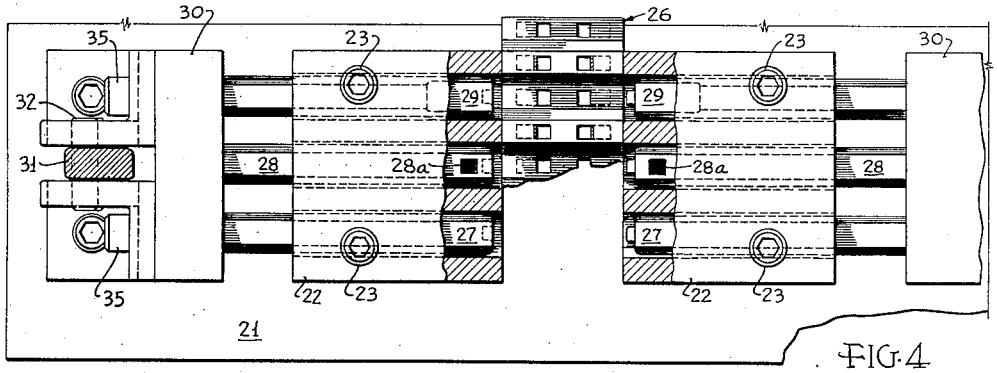
Fig. 4 is a plan view, partly in section on the same plane as that of Fig. 3, showing the parts in a different position.

The device forms a tab on a sheet by punching out the tab along its periphery except at one edge which is left connected to the sheet as a hinge, after which the tab is bent back on the sheet. By placing a plurality of sheets together and punching out tabs together and turning them back, i.e. clinching them, the sheets are united. In the present illustrated form two sheets are thus connected.

The connections are here made in corrugated sheets which when connected form a honeycomb grid. The grid is relatively short, as illustrated, so the sheets may be referred to as strips. By coating these strips with a brazing material, copper for example, the strips can be subsequently brazed together. The connections made by the present apparatus hold the parts closely together throughout so that the subsequent brazing will be done perfectly.

After a honeycomb grid is formed it is ground smooth across the ends of the grids to provide a plane surface for attaching cover sheets. In attaching the cover sheets it is often helpful to create a vacuum within the assembly and for this purpose the communicating holes made by the present method of cell connection are beneficial for rapid and complete evacuation. With other forms of connection, such as welding for example, it is necessary to provide communicating holes by another operation after the connections have been made.

If the tabs were formed one at a time there would be a tendency for one sheet to slip slightly endwise relative to the other and this would necessitate an undue amount of surface grinding before applying the cover sheets. According to the present invention two tab connections are made simultaneously whereby the tendency to slip in one direction is balanced by the tendency to slip in the opposite direction.

The simple apparatus which is illustrated herein comprises upstanding supports 20 mounted on a base 21 and connected at the top by a tie plate 22 secured by cap bolts 23. The space between the supports is made equal to the width of the strips 25 which are used to form the honeycomb grid, here referred to by the reference numeral 26. To state it another way, the space between the supports is equal to the length of the honeycomb grids with sufficient clearance to avoid binding.

The honeycomb grid is formed from the top and is fed downward between the supports as it is completed. As it is formed the honeycomb grid is supported on a plurality of mandrels 27, 28 and 29 which fit in the corrugations of the strips 25. The mandrels fit slidably in openings in the upstanding supports 20 and are moved in and out by connecting bars 30 operated by hand levers 31 pivoted at the base on pins 32 and pivoted to the bars 30 by pins 33. The holes for the pins 33 are slightly elongated to permit the necessary movement in action. As shown in Fig. 3, the mandrels are secured to the bars 30 by cap bolts 35.

To provide a rigid bridge support when brought together, the mandrels are mated at their ends as shown best in Figs. 5 to 10, one of the mandrels having a recess 36 and the other having a projection 37 fitting in the recess.

The top strip is held down in accurate posiiton and shape by a ribbed bar 40 which is resiliently held down by springs 41 acting in enclosed sockets against pins 42 carried by the bar 40 and against retaining plugs 43 screwed in the socket holes of a hold-down block 44. The block 44 is mounted on support pins 45 slidably carried in guide holes in the top tie plate 22. At the upper end the guide pins 45 are secured in a plate 46 which at each side carries pins 47 to which are pivoted connecting links 48. The links are connected to spaced levers 49 by pivot pins 50. The levers 49 are pivoted on a pivot axis or shaft 51 and at the other end are provided with a latch 52 pivoted at 53 and having a pin 54 adapted to latch on a notched catch 55 carried by the tie plate 22. Springs 56 urge the levers 49 upward and a spring 57 urges the latch 52 upward.

All of the mandrels support the grid and hold the corrugations in shape except at the start before the stock has reached the mandrel 29. Assuming the sequence of operations to have started, the mandrels 27 fit in the openings of unpunched strips, the mandrels 29 fit in the openings of connected strips, and the mandrels 28 are formed with transverse die openings 28a which cooperate with chisel-shaped punches 60 to cut out the tabs 61 from the strips 25. The punches operate in guide openings 62 in the ribbed bar 40 and are carried by a slide 63 which is slidable in an opening 64 in the bar 40, in an opening 65 in the block 44, in an opening 66 in the tie plate 22, and in an opening 67 in the plate 46.

The slide 63 is operated by a hand lever 70 through a connecting pin 71, the lever being pivoted by a pin 72 to a link 73 which is pivoted to the shaft 51.

In Fig. 11 the starting position of parts is shown. The work or grid assembly advances to the right after each connection is made. Two connections are shown to have been made and the grid has been moved to the right ready to make another connection. The ribbed hold-down bar 40 is in raised position but is ready to be brought down to hold the grid down on the mandrels.

Figure 5:
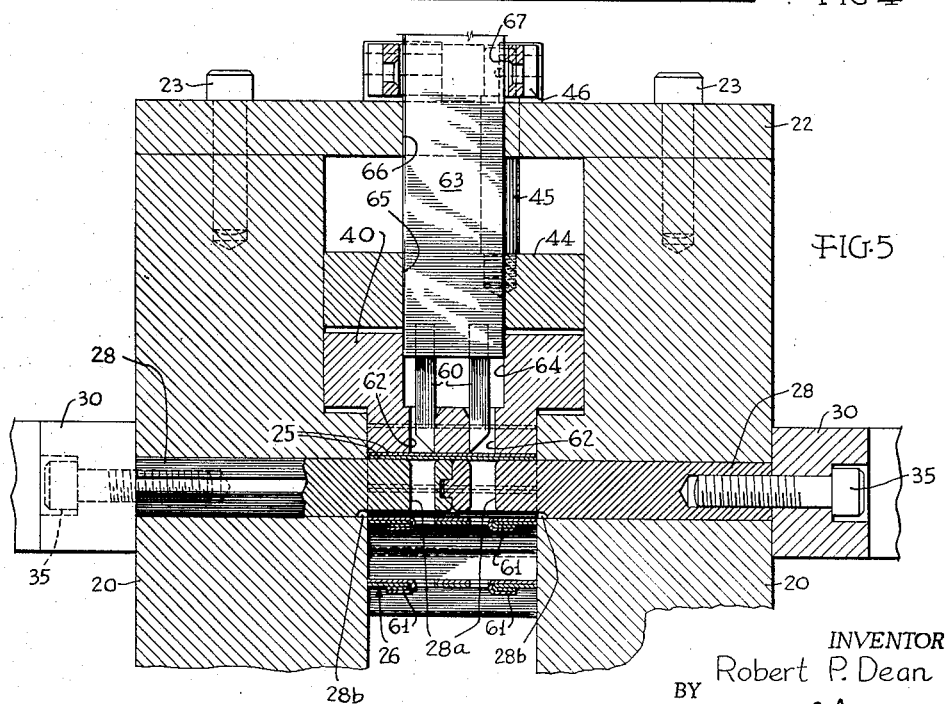
Fig. 5 is an enlarged vertical section taken on the line 5—5 of Figs. 2 and 3.

In Figs. 5 and 12 the ribbed hold down bar 40 has been brought down and secured by the latch 52 (Fig. 12). The bar 40 is pressed down away from the hold-down block 44 by the springs 41 to hold the work down tightly on the mandrels. In the latched-down position there is space for the ribbed bar 40 to move up slightly for a purpose which will be explained presently.

In Fig. 6 the punches 60 are beginning to cut the double tabs 61 from the two strips and push them into the die openings 28a in the mandrels 28, the punches shearing the edges of the tabs by action against the edges of the die openings. The chisel shape of the punches causes the tabs to be bent back as they are cut out.

In Figs. 7 through 9 the tabs are shown completely cut out except at the one edge.

In Fig. 8 the punches have been withdrawn upwardly and the mandrels have started to move outward away from each other. In this movement of the mandrels the inner end edges of the openings 28a engage the tabs and bend them backward to start the clinching operation.

In Fig. 9 the mandrels have moved back further and ride under the tabs. Fig. 13 shows the parts in the same position as viewed in a transverse plane. This tends to raise the grid and this is permitted because the ribbed bar 40 is able to move upward against the hold-down springs 41. The mandrels 28 are cut away on the bottom side at 28b to allow the grid to rise below them. Mandrels 27 are also made of similar depth, not to make space to clear tabs—for none are yet formed here—but to allow the grid to move up evenly without being bent between the mandrels 27 and 28. Mandrels 29 are made shallow at 29b at the bottom for the same reason and are also cut away on the top at 29c to clear the tabs which have already been formed.

While means have been provided for clinching the tabs, including the above-described means for providing clearance for the bent tabs, it is possible to perform the clinching operation without this refinement in apparatus. Actually, the metal is usually very thin—much thinner than can be illustrated to scale in the drawings—and the mandrels 28 can bend down the small amount necessary to ride under the clinched tabs. There is a slight yield also in the ribbed bar 40 and its fastenings.

As seen in Figs. 8 and 9, the action is completely symmetrical about the mid-length of the cells so there is no tendency at all to slide one strip relatively to the other in forming the connections.

Herein one grid cell at a time is connected. Hand apparatus would require too much power to do more. However, it can readily be seen that if power apparatus is used it would be possible to make all connections of a strip at one time, a set of punches being used for each rib of the ribbed bar and the bar being made long enough, together with an adequate number of mandrels to embrace the entire length of a strip.

As each strip is attached the grid is lowered between the spaced supports until the entire grid has been formed, It will be seen that the tab connections hereby provided not only hold the sheet material tightly together for brazing and/or other purposes but also leave holes for communication to aid in evacuating the assembly when the cover sheets are applied. Very little grinding of the ends of the grids is required because the edges are kept even.

While one embodiment of the invention has been described for purposes of illustration it is to be understood that there may be various embodiments and modifications within the general scope of the invention.

What is claimed is:

1. Apparatus for forming tab fastenings on sheet material comprising in combination, a support, a slidable mandrel reciprocably mounted on said support provided with a transverse die opening, a member mounted on said support in position to hold a sheet down on said mandrel, a punch movable into said transverse die opening to punch out a tab with a connected end and bend it about the connected end as a hinge into said die opening, and means for moving said mandrel back across said bent-down tab to clinch it against the sheet beneath said hold-down member and sheet.

2. Apparatus for forming tab connections on sheet material, comprising in combination, a support, a slidable mandrel reciprocably mounted on said support provided with a transverse die opening, a member mounted on said support in position to hold overlapping sheets down on said mandrel and having a punch guide opening disposed above the die opening in the mandrel, a chisel-shaped punch movable through said guide opening and into said transverse die opening to punch out tabs with integral connections at one end from said sheets and bend them about the connected ends as a hinge into said die opening, and means for moving said mandrel and sheets endwise relative to each other to turn the bent-down tabs back under said sheets while the sheets are held down by said hold-down member.

3. Apparatus for forming tab connections on sheet material, comprising in combination, a support, a slidable mandrel comprising two mandrel parts slidable endwise on said support toward and from each other, means for holding sheet material down on said mandrel parts, said mandrel parts being formed with transverse die openings therein, punches mounted for cooperation with the transverse die openings in said mandrel parts to cut out tabs, each with a connected end, in the sheet material with their free ends directed oppositely and to bend the tabs down into said mandrel die openings, and means for moving said mandrel parts across said bent-down tabs to clinch them against the sheet beneath said hold-down means and sheet.

4. Apparatus for forming tab connections on sheet material as set forth in claim 3, further characterized by the fact that said punches and mandrel die openings are so formed and arranged as to punch the tabs with their free ends directed oppositely and pointing toward each other with the tab end hinge connections disposed remotely from each other, and said mandrel parts turning said tabs back in their travel away from each other so they point away from each other.

5. Apparatus for forming tab connections on sheet material as set forth in claim 3, further characterized by the fact that said mandrel parts are formed with interfitting elements at their ends to provide added mutual bridging support.

6. Apparatus for forming tab fastenings on corrugated sheet material, comprising in combination, a support, a plurality of slidably mounted mandrels reciprocably mounted on said support arranged in parallel to fit in the sheet corrugations, hold-down means fitting the shape of said corrugated sheet material for holding it down on said mandrels, one of said mandrels being formed with a transverse die opening, a punch mounted to cooperate with the die opening of said mandrel to punch out a tab with a connected end from said sheet material and bend it down into said die opening, and means for moving said mandrel with the die opening back across said bent-down tab to clinch it against the sheet material beneath said hold-down means and sheet material.

7. Apparatus for forming tab fastenings on corrugated sheet material, comprising in combination, a support, a plurality of slidably mounted mandrels reciprocably mounted on said support arranged in parallel to fit in sheet corrugations, hold-down means fitting the shape of said corrugated sheet material for holding it down on said mandrels, one of said mandrels being formed in two co-operating oppositely moving parts, each part being formed with a transverse die opening, punches mounted to cooperate with the die openings in said mandrel parts to punch out tabs, each with a connected end, from said sheet material and bend them down into the die openings, and means for moving said mandrel parts with the die openings back across said bent-down tabs to clinch them against the sheet material beneath said hold-down means and sheet material.

8. Apparatus for forming tab fastenings on corrugated sheet material as set forth in claim 7, further characterized by the fact that all of said mandrels are formed of oppositely movable parts.

9. Apparatus for forming tab fastenings on corrugated sheet strip material to form therefrom a honeycomb grid with communicating openings between the cells of the grid, comprising in combination, a base, upstanding supports carried on said base with spacing between them corresponding to the width of said sheet strip material or the length of the grid cells, a plurality of parallel mandrels mounted to slide endwise in one of said spaced supports to support corrugated strips thereon, means mounted for vertical movement for holding corrugated sheet material down on said mandrels, one of said mandrels being formed with a transverse die opening, a vertically movable punch mounted to cooperate with the die opening of said mandrel to form tabs, each with a connected end, in overlying strips and bend them down into said die opening, and means for moving said mandrels back to clear the space between said supports to allow the forming grid to be shifted, the mandrels being of a size to enter cells of the grid to allow shifting of the grid downward after each successive strip is fully connected at the top, said mandrel with the die opening when withdrawn bending said tabs back up under the lower sheet strip beneath the hold-down means to clinch the tabs.

10. Apparatus for forming tab fastenings on corrugated sheet strip material as set forth in claim 9, further characterized by the fact that said mandrels are each formed in two parts which move in opposite directions, one part being slidably mounted in one of said supports and the other mandrel part being slidably mounted in the other one of said supports.

11. Apparatus for forming tab fastenings on corrugated sheet strip material as set forth in claim 10, further characterized by the fact that the mandrel parts of each mandrel are formed with mating elements to form a bridging support, and that the mandrel parts of one mandrel are each formed with a transverse die opening, and a punch cooperating with each opening to form tabs at two points along the wall of each cell, the tabs being oppositely directed away from each other when clinched.

12. Apparatus for forming tab fastenings for sheets as set forth in claim 10, further characterized by the fact that said mandrel and hold-down means are constructed and arranged to provide additional space between the mandrel and hold-down means to allow the mandrel to ride over the clinched tabs.

13. Apparatus for forming tab fastenings for sheets as set forth in claim 12, further characterized by the fact that a mandrel is formed with a cut-away portion on one side to allow it to clear the tabs.

References Cited in the file of this patent

UNITED STATES PATENTS

| | | |
|---|---|---|
| 1,919,999 | Borton | July 25, 1933 |
| 2,093,202 | Maynes | Sept. 14, 1937 |
| 2,586,479 | Pettorossi | Feb. 19, 1952 |
| 2,642,952 | Landgraf | June 23, 1953 |